Figure 1:
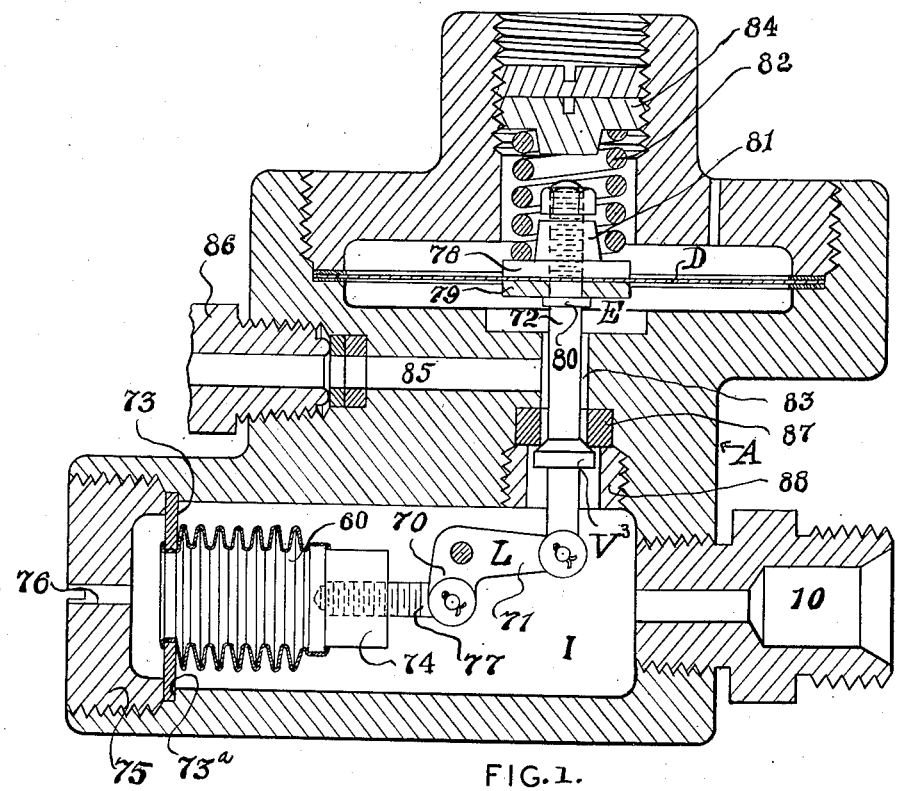

Aug. 20, 1940.                W. F. MESINGER                2,212,210
                                BALANCED VALVE
                    Original Filed Dec. 30, 1932    2 Sheets-Sheet 1

INVENTOR
WILLIAM F. MESINGER
BY
ATTORNEY

Patented Aug. 20, 1940

2,212,210

UNITED STATES PATENT OFFICE 2,212,210

BALANCED VALVE

William F. Mesinger, Mount Vernon, N. Y., assignor, by mesne assignments, to Union Carbide and Carbon Corporation, a corporation of New York Original application December 30, 1932, Serial No. 649,485, now Patent No. 2,091,051, dated August 24, 1937. Divided and this application January 7, 1937, Serial No. 119,473

6 Claims. (Cl. 50—26)

This invention relates to the balancing of valves in control of the flow of fluid through a passage and more particularly to the use of such balanced valves in fluid pressure regulators for maintaining the discharge pressure of fluid passing through such regulators uniform.

In regulators of this character, there has heretofore been provided a casing with a passage therethrough divided into inlet and outlet portions in which the flow of fluid from the inlet to the outlet portion is under control of a valve operated automatically by pressure-responsive means, as a diaphragm, under influence of changes in pressure on the outlet side of the valve and suitably connected with the valve so as to vary its position with respect to its seat in accordance with the changes in fluid pressure in the outlet portion of the passage. In normal operation of the apparatus, such a construction gives quite satisfactory results but when variations occur in head pressure on the intake side of the valve above or below a normal range for which the apparatus is adapted, it seriously affects the regulatory operations of the valve under influence of discharge pressure so as to cause objectionably wide variations in the discharge pressure from that for which the pressure-responsive means is adjusted.

An important object of the invention, therefore, is to provide, in regulator apparatus of the above character having a valve operable under influence of pressure changes on the outlet side thereof for maintaining the discharge pressure of the apparatus uniform, improved means whereby the valve, in its regulatory movements, will be rendered unresponsive to pressure changes on the inlet side thereof.

In accordance with this invention, regulator apparatus of the above character embodying the principles of the invention may include a valve controlled under normal operation by means responsive to changes in pressure in the passage on the outlet side of the valve and a pressure responsive member in the passage on the inlet side of the valve which is operable under the influence of pressure changes and so constructed and so connected with the valve that the effects of changes in head pressure on the valve and on the pressure responsive member will counterbalance each other and nullify the influence of such head pressure upon the normal operation of the valve under control of pressure changes in the outlet portion of the passage; the pressure responsive member being preferably contractible and expansible under influence of pressure changes.

Figure 2:
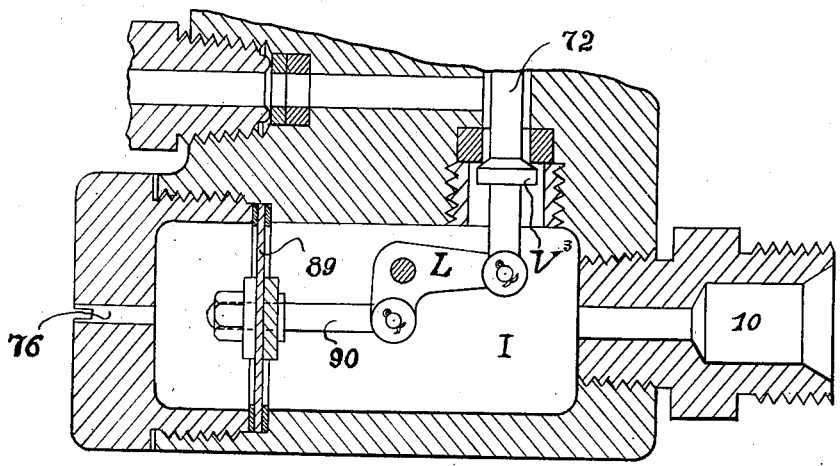
Figure 3:
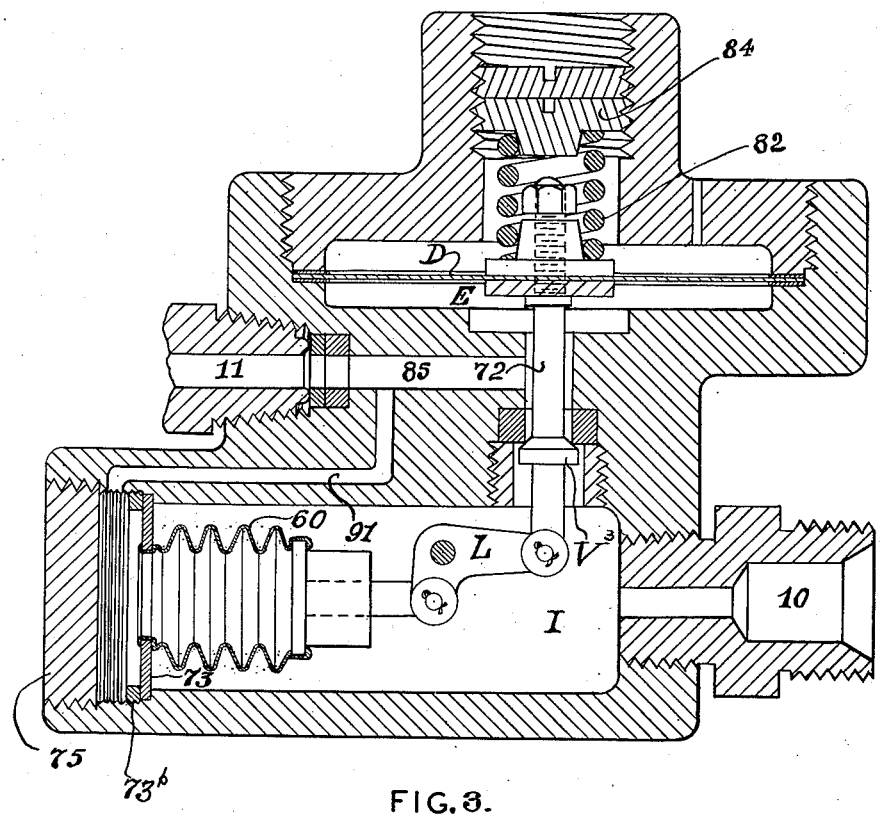

The above and other objects and the novel features of the invention will be made apparent from the following specifications taken in connection with the accompanying drawings, in which Fig. 1 is a sectional view of one embodiment of the invention;

Fig. 2 is a fragmentary sectional view of an apparatus similar to that shown in Fig. 1 and showing a diaphragm substituted for the bellows; and Fig. 3 is a sectional view of another form of the apparatus showing the interior of the bellows in communication with the outlet portion of the passage through the apparatus according to the invention.

This application is a division of my copending application Serial No. 649,485 filed December 30, 1932, now United States Patent No. 2,091,051, granted Aug. 24, 1937, and which relates to a regulator structure wherein the compensating pressure responsive contractible means is directly connected with the valve.

The form of the invention illustrated in Fig. 1 of the drawings is particularly adapted for use in situations where it is desired to provide a valve of comparatively small effective surface area in connection with pressure compensating bellows of considerable effective surface. Where a valve of small effective area is to be used, it is difficult to provide a pressure compensating bellows of sufficiently small effective area to properly compensate for the pressure exerted on the effective area of the valve when connected directly therewith as described in the patent above referred to, and at the same time maintain the desired degree of elastic responsiveness of the bellows to pressure changes. The bellows 60 in the present apparatus is therefore preferably connected with the valve $V^3$ through power change mechanism which, in the present apparatus, is in the nature of a bell crank lever L pivotally supported in the inlet chamber I of the casing A and having a short arm 70 pivotally connected with the bellows 60 and a long arm 71 operatively connected to a stem 72 upon which a valve $V^3$ is carried and with which it is preferably formed integral.

The effective area of bellows 60 is considerably greater than that of the valve $V^3$, as shown, and the relationship of the effective area thereof to that of the valve and the relative lengths of the lever arms to each other may be determined according to well-known physical laws so that the moment of force on the effective surface area of the bellows within the inlet chamber will be exactly equal to and exactly counteract that exerted on the valve thereby leaving the valve free to operate according to the normal design of the apparatus under influence of pressure changes in the diaphragm chamber E from a predetermined normal as exerted on the valve through the diaphragm D which is positioned to seal the upper side of the diaphragm chamber E and connected to the valve through a portion of the stem 72 that projects above the valve. In other words, the ratio of the lever arms may be selected to correspond inversely to and compensate for a given ratio of effective bellows area to effective valve area.

The bellows 60 is preferably arranged at right angles to the direction of movement of the valve $V^3$ which closes with the inlet pressure and within the bore of the inlet chamber I which is provided with a high pressure gas inlet connection 10. The bellows is connected in a gas-tight manner at its opposite ends respectively to an annular supporting disc 73 and a head plug 74, the former being held against a shoulder 73a at the end of the bore by the closure cap 75 which is, in this form of the invention, centrally apertured at 76 to expose the interior of the bellows to atmospheric pressure; the head plug 74 being pivotally connected to the end of the short lever arm 70 by a screw 77. The valve stem 72 is arranged in a passage 83 between the inlet chamber I and the diaphragm chamber E and extends upwardly through the diaphragm D to which it is clamped by means of plates 78 and 79; the lower plate resting on a collar 80 formed on the stem between which and a nut 81 the plates are clamped against opposite sides of the diaphragm. A yieldable pressure means 82 is provided on the upper side of the diaphragm. The yieldable pressure means 82 is preferably of such character that its force value will change relatively very little with the normal regulatory movement of the valve when the force on the valve due to inlet pressure is exactly balanced. When a coiled spring is used, as shown in the drawings, it is desirable that the effective area resultant force values should differ by an amount sufficient to cause a change in relative force therebetween sufficient to compensate for changes in force of the spring due to movement of the valve. The lower end of spring 82 bears on plate 78 and is held under compression by means of a plug 84 which serves with the spring to regulate the responsiveness of the diaphragm to pressure in the outlet chamber E and to adjust the normal position of the valve. An outlet passage 85 leads from the passage 83 to the outlet port 11 in which is connected a distributing conduit 86. The valve seat 87 is held in place by a ring nut 88 and is seated in a counterbore at the lower end of passage 83.

The lever arrangement, as disclosed in Fig. 1, permits substitution of a diaphragm for the bellows. Since diaphragms are adaptable to a wider range of pressures than the bellows constructions that are feasible for regulator purposes, the larger forces operating on a diaphragm may be therefore balanced against the forces on the valve through the lever connection. The diaphragm being connected to the shorter arm of the lever, its movement is much reduced compared to the normal travel of the valve. Such an arrangement is shown in Fig. 2 of the drawings in which the compensating diaphragm 89 is shown in place of the bellows illustrated in the other figures of the drawings as connected to the shorter lever arm by a stem 90. The connection between the lever L and the valve stem 72 should provide transverse play so that straight line motion of the stem may be translated into rotary motion of the lever.

When it is desired to more exactly balance out the variations in head pressure on the valve, the portion of the inlet chamber I on the opposite side of the partition formed by the bellows 60 and the supporting disc 73 from that in which the valve is located may be placed in communication with the outlet passage 85 as shown in Fig. 3. The apparatus as illustrated in this figure, shows the bellows 60 mounted as in Fig. 2 with its open end in communication with the portion of chamber I to the left of the bellows supporting disc 73, which portion is connected with the outlet passage 85 by a cross passage 91. In this form of the invention the supporting disc 73 is held in place against the shoulder 73a by a ring screw 73b and the vent 76 of Figs. 3 and 4 is omitted. By this arrangement the ratio of pressures acting on the inlet and outlet sides of the valve V are always equal to the ratio of pressures acting on the outside and inside of the bellows.

The lever L may also be arranged within the outlet chamber E so as to connect the stem 72 on the outlet side of the valve $V^3$ with the low pressure side of the movable head of the bellows or diaphragm that forms the separating partition between the chambers I and E.

I claim:

1. In pressure regulating apparatus, the combination comprising a casing having a passage therethrough divided into inlet and outlet portions; valve means opening against inlet pressure controlling the flow of fluid from the inlet to the outlet portion under influence of pressure in the outlet portion; means of yieldably holding the valve in suspension in the passage; and a resilient collapsible sleeve in the inlet portion connected to the valve and secured to a support for acting to counterbalance the effect of variations of pressure on the valve from a predetermined normal on the inlet side thereof; the interior of the sleeve being subject to the pressure of the outlet portion of the passage.

2. In pressure regulating apparatus, the combination comprising a casing having a passage therethrough divided into inlet and outlet portions; valve means opening against inlet pressure controlling the flow of fluid from the inlet to the outlet portion under influence of pressure in the outlet portion; and a hollow contractible sleeve in the inlet portion connected to the valve and to a support and responsive to changes of pressure therein for preventing such changes of inlet pressure from causing any variation in the operation of the valve from that normal under influence of pressure in the outlet portion of the passage; said sleeve being connected to the valve through lever means pivoted in the inlet portion.

3. A pressure regulating device comprising a casing having a passage therethrough; a valve for controlling the flow of fluid through the passage from the inlet to the outlet sides thereof and closing with inlet pressure; means directly connected with said valve for operating said valve in response to pressure changes in the outlet side of the passage; and means for counteracting the effect of changes of inlet pressure upon the operation of said valve including resilient pressure responsive means exposed to the inlet pressure connected with the valve through force changing means so proportioned that the force exerted on the valve resulting from inlet pressure is substantially balanced by the force exerted by said pressure on said last mentioned pressure responsive means.

4. A pressure regulating device comprising a casing having a passage therethrough; a valve for controlling the flow of fluid through the passage from the inlet to the outlet sides thereof and closing with inlet pressure; means for operating said valve in response to pressure changes in the outlet side of the passage including a spring acting to open said valve with a force that diminishes as the valve opens; and means for counteracting the effect of changes of inlet pressure upon the operation of the valve including a resilient contractile sleeve having an effective area different than that of said valve exposed to inlet pressure and having its movable end connected with the valve through force changing means so proportioned that the force exerted on the valve by inlet pressure is substantially balanced by the force exerted by the same pressure on the sleeve.

5. A pressure regulating device comprising a casing having a passage therethrough; a valve for controlling the flow of fluid through the passage from the inlet to the outlet sides thereof and closing with inlet pressure; means for operating said valve in response to pressure changes in the outlet side of the passage including a spring acting to open said valve with a force that diminishes as the valve opens; and means for counteracting the effect of changes of inlet pressure upon the operation of the valve including a resilient contractile sleeve having an effective area larger than that of said valve exposed to inlet pressure and having its movable end connected with the valve through a lever whose arms are so proportioned that the product of the effective area on which inlet pressure acts on the valve and the length of the lever arm connected thereto is substantially equal to the product of the corresponding effective area of the sleeve and its lever arm.

6. A pressure regulating device comprising a casing having a passage therethrough; a valve for controlling the flow of fluid through the passage from the inlet to the outlet sides thereof and closing with inlet pressure; means directly connected with said valve for operating said valve in response to pressure changes in the outlet side of the passage; and means for counteracting the effect of changes of inlet pressure upon the operation of said valve, said means comprising a pressure responsive device having an effective area exposed to the inlet pressure and arranged to exert a force which varies in response to changes in the inlet pressure, said area being substantially larger than the effective area of said valve, and pivoted lever means connected between the movable portion of said pressure responsive device and said valve, the lever arms being so proportioned that the force of inlet pressure acting on the effective area of said valve is balanced by the larger force exerted by said pressure responsive device, whereby the outlet pressure remains substantially constant irrespective of changes in the inlet pressure.

WILLIAM F. MESINGER.